No. 887,197. PATENTED MAY 12, 1908.
J. E. JOHNSTON & J. M. CRAHAN.
SAW SET.
APPLICATION FILED OCT. 15, 1906.

Witnesses
K. V. Clendening.
Thomas W. McMeans

Inventors
John E. Johnston.
James M. Crahan.
BY Bradford Hood
Attorneys

UNITED STATES PATENT OFFICE.

JOHN EDWARD JOHNSTON AND JAMES M. CRAHAN, OF INDIANAPOLIS, INDIANA.

SAW-SET.

No. 887,197.  Specification of Letters Patent.  Patented May 12, 1908.

Application filed October 15, 1906. Serial No. 339,078.

*To all whom it may concern:*

Be it known that we, JOHN E. JOHNSTON and JAMES M. CRAHAN, citizens of the United States, residing at Indianapolis, in the county of Marion and State of Indiana, have invented certain new and useful Improvements in Saw-Sets, of which the following is a specification.

The object of our invention is to produce a simple yet efficient saw-set by means of which the teeth of saws of varying thicknesses will be accurately set, the degree of set being readily determined by the proper adjustment of the parts.

The accompanying drawings illustrate our invention.

Figure 1:
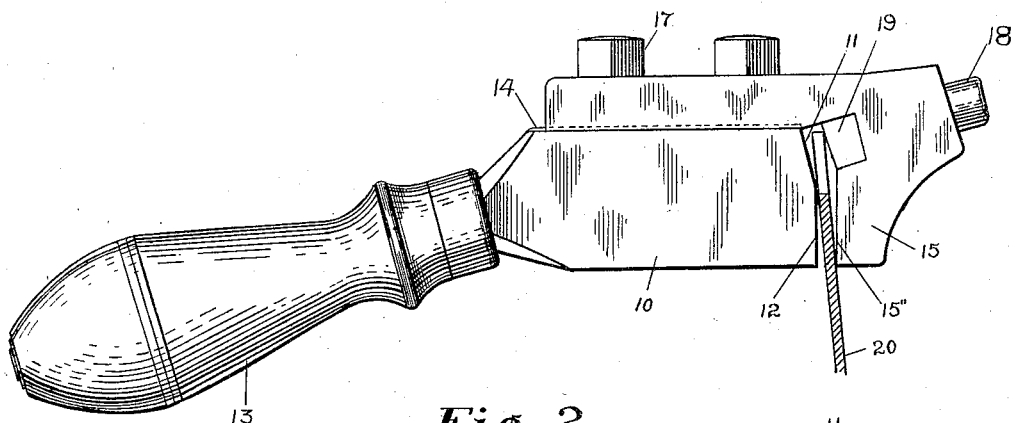
Figure 2:
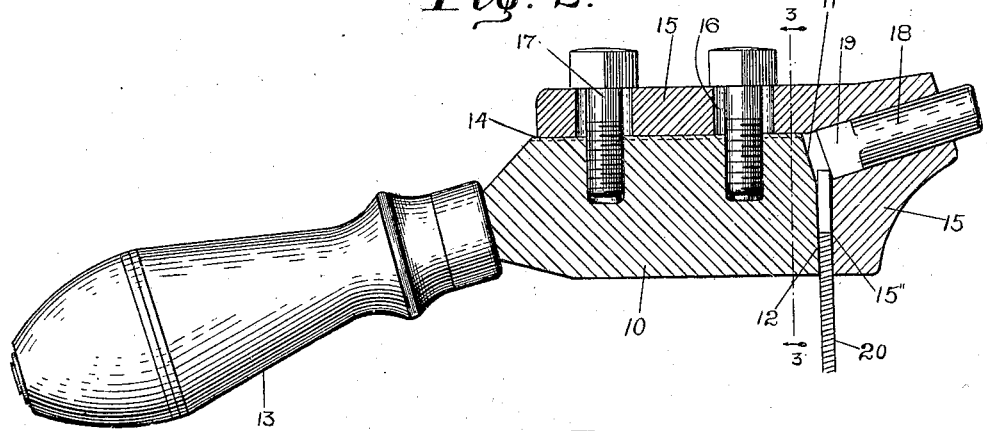
Figure 3:
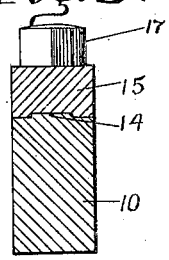

Figure 1 is a side elevation; Fig. 2 a vertical section with the parts in adjustment different from that shown in Fig. 1; Fig. 3 a section on line 3—3 of Fig. 2.

In the drawings, 10 indicates the main body of the tool provided at its upper outer corner with an anvil surface 11 which is inclined to the end or gage surface 12 which is preferably the squared end of the body 10. For this reason the body 10 should preferably be made of hardened steel and may be provided with a suitable handle 13. The upper edge of the body 10 is provided with a guide-way 14 adapted to receive the adjustable hammer-holder 15, the guide 14 serving to hold said hammer-holder against transverse displacement. The hammer-holder 15 is provided with one or more slots 16 through which fastening screws 17 are passed into the body 10. Reciprocably mounted in the hammer-holder 15 is a hammer 18, the head 19 of which has a hammer end parallel with the anvil surface 11. Holder 15 is provided with a gage finger 15' having an inner face 15" which extends below the hammer head 19 and lies parallel with the squared end 12 of body 10.

The operation is as follows: The hammer-holder is adjusted upon body 10 until surface 15" thereof lies the desired distance from surface 12, said distance being greater than the thickness of the saw 20. The tool is then slipped upon the saw, the surface 12 being held against one face thereof and the saw entered as far as possible, until the end of the tooth to be set comes into engagement with the inner end of the hammer head 19. The tool is then canted upon a saw, as shown in Fig. 1, and a blow struck upon the outer extended end of the hammer 18, thus driving the head 19 against the tooth and setting the tooth over against the anvil 11. The amount of set of the tooth is determined by the width of the space between surfaces 12 and 15", the greater said distance being the greater distance the saw may be entered into the tool before it strikes the hammer head 19.

We claim as our invention:

1. In a saw set, the combination, with an anvil head having a gage surface and an adjacent anvil surface, of a gage finger arranged substantially parallel with the gage surface of the anvil head and movable toward and from said gage surface, means for positively holding said gage finger at different distances from the gage surface of the anvil head independent of saw thickness, and a hammer carried by the gage finger and movable therein to coöperate with the anvil surface.

2. In a saw set, the combination, with an anvil head having a gage surface and an adjacent anvil surface on its end, of an L-shaped member the shank of which engages the anvil head, means for clamping said shank upon the anvil head in different positions of longitudinal adjustment, a gage surface formed on the inner side of the foot of the L-shaped member substantially parallel with the gage surface of the anvil head, and a hammer reciprocably mounted in the foot of the L in position to coöperate with the anvil surface of the anvil head, substantially as and for the purpose set forth.

In witness whereof, we have hereunto set our hands and seals at Indianapolis, Indiana, this 13th day of October, A. D. one thousand nine hundred and six.

JOHN EDWARD JOHNSTON. [L. S.]
JAMES M. CRAHAN. [L. S.]

Witnesses:
ARTHUR M. HOOD,
THOMAS W. McMEANS.